(12) United States Patent
Johri

(10) Patent No.: US 7,426,562 B1
(45) Date of Patent: Sep. 16, 2008

(54) METHOD FOR NETWORK CAPACITY PLANNING WITH PROPER ACCOUNTING OF SPARE CAPACITY

(75) Inventor: Pravin K. Johri, Aberdeen, NJ (US)

(73) Assignee: AT&T Corp., New York, NY (US)

( * ) Notice: Subject to any disclaimer, the term of this patent is extended or adjusted under 35 U.S.C. 154(b) by 944 days.

(21) Appl. No.: 10/750,314

(22) Filed: Dec. 31, 2003

Related U.S. Application Data

(60) Provisional application No. 60/486,497, filed on Jul. 11, 2003.

(51) Int. Cl.
*G06F 15/16* (2006.01)
*G06F 15/173* (2006.01)

(52) U.S. Cl. .................................. 709/226; 709/223

(58) Field of Classification Search ............... 705/7, 705/8, 20; 709/223, 224, 226
See application file for complete search history.

(56) References Cited

U.S. PATENT DOCUMENTS

| 6,795,399 B1 * | 9/2004 | Benmohamed et al. ...... 370/235 |
| 2003/0158765 A1 * | 8/2003 | Ngi et al. ........................ 705/7 |

\* cited by examiner

*Primary Examiner*—Jeffrey Pwu
*Assistant Examiner*—Scott M Sciacca

(57) ABSTRACT

An apparatus and method for introducing new factors to properly account for the benefits of carrying an appropriate amount of capacity in a communication network. The present invention defines a variable that represents the benefit of the spare capacity of a link. The notion of benefit is similar to the notion of a negative cost of link augments.

7 Claims, 3 Drawing Sheets

METHOD FOR NETWORK CAPACITY PLANNING WITH PROPER ACCOUNTING OF SPARE CAPACITY

This application claims the benefit of U.S. Provisional Application No. 60/486,497 filed on Jul. 11, 2003, which is herein incorporated by reference.

The present invention relates generally to communication networks and, more particularly, to a method for capacity planning with proper accounting of spare capacity.

BACKGROUND OF THE INVENTION

In traditional capacity planning methods, there is usually little spare capacity left in the network after each capacity planning horizon is executed. This is due to the fact that spare capacity shows up simply as cost and costs are being minimized in traditional capacity planning methods. Therefore, a network could run out of capacity in places soon after the current planning time horizon is over. This further leads to the needs to augment many of the network links in the very near future. Thus, such capacity planning method can minimize the current cost but at the expense of incurring a larger cost in the near future. In order to minimize the current cost, these methods end up proposing long routes for many of the circuits, e.g., a shorter route is not available because one of the required links does not have the necessary capacity. However, since additional capacity will eventually be added on all the links, these circuits with unnecessarily long routes will then show up as misrouted circuits and will need to be re-groomed. This involves extra operations cost as well as a hit, a brief service interruption, to the circuit. Furthermore, it also requires getting a customer's permission before a circuit can be re-groomed, which is a very time-consuming manual process.

To avoid the aforementioned shortcomings in the traditional capacity planning methods, the network must maintain an appropriate amount of spare on each link as it takes a fairly long lead-time to order new capacity and capacity is deployed in relatively large chunks. Therefore, a need exists for a method and apparatus for capacity planning with proper accounting of spare capacity within a network.

SUMMARY OF THE INVENTION

In one embodiment, the present invention improves upon the traditional capacity planning methods by introducing new factors in the optimization methods to properly account for the benefits of carrying the appropriate amount of capacity in the network. For example, the present invention defines a variable that represents the benefit of the spare capacity of a link. The notion of benefit is similar to the notion of a negative cost (of link augments). In this fashion, a new objective function is created that no longer simply minimizes the cost of all the capacity augments but instead accounts for the benefit of the spare capacity left in the network as well.

This new objective function does not suffer from the problems associated with traditional capacity planning methods. Long routes are discouraged because they lead to less spare capacity, a smaller (negative) value of the second term and, thus, higher value of the objective function. Augments no longer simply appear as a (large) cost. If they leave a fair amount of spare capacity behind then the cost of the augment is appropriately reduced. This would not leave the network with a small amount of spare capacity as in the prior art.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
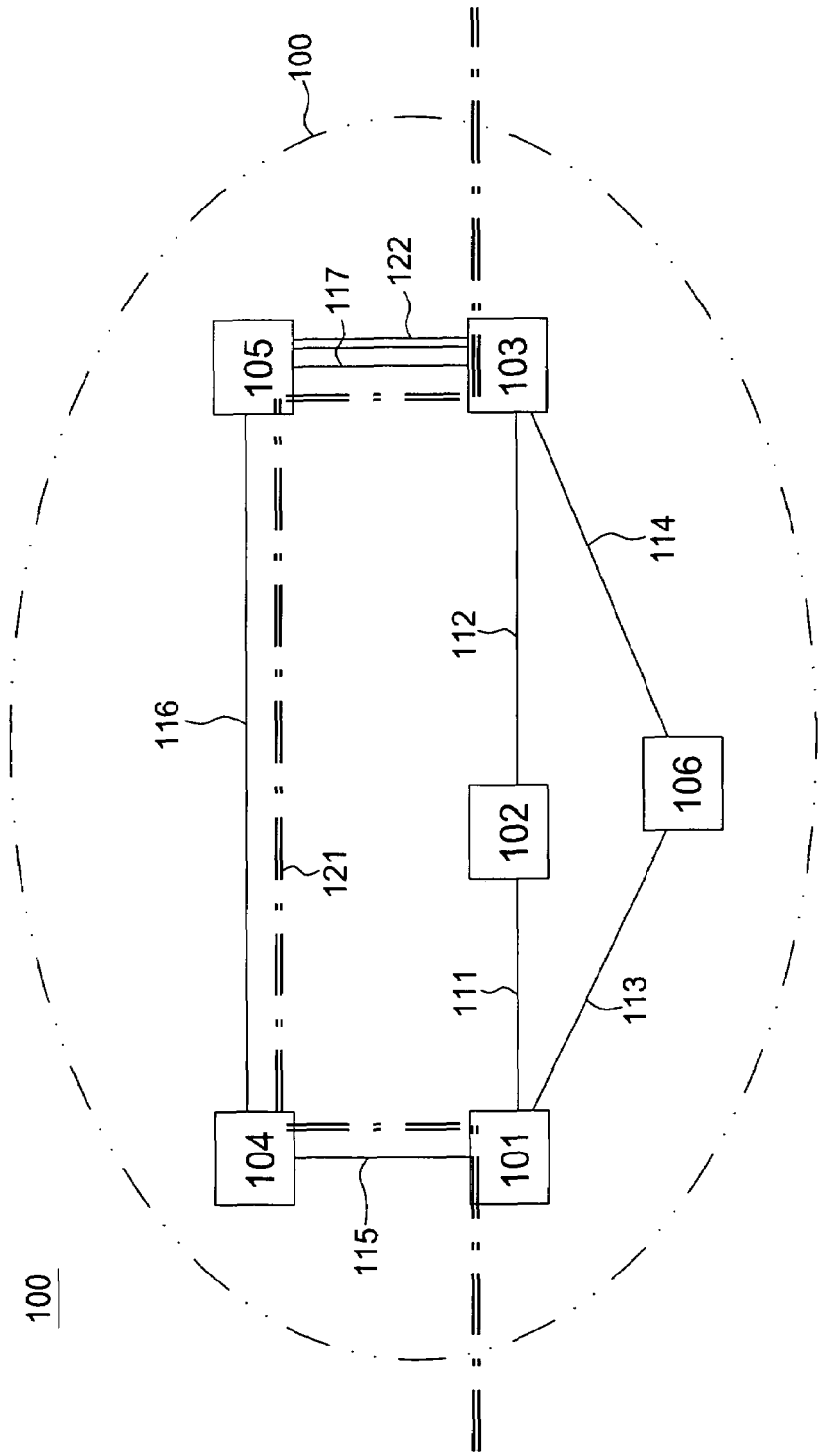
FIG. 1 illustrates a block diagram of a communication network comprising a plurality of nodes and a plurality of links.

The present invention relates to circuit-oriented communication networks. These networks include, but are not limited to, an optical switch or optical cross connect network, an Asynchronous Transfer Mode (ATM) network, a Frame Relay network, a network of Multi-Protocol Label Switching (MPLS) enabled label switched routers, and a network of Lambda (optical wavelength) routers.

These networks consist of a number of switches connected by communication links. There could be multiple links between a given pair of switches and not every pair of switches needs to be connected to each other. A link could consist of multiple lines or wavelengths. Lines could be of various sizes that are generally expressed in bandwidth units such as DS3, OC3, OC12, OC48, etc. Each link is bi-directional and has a provisioned administrative weight. In fact, there may be two weights per link, one in each direction. These are typically set to the same value, so only one is used here. Other parameters are the total bandwidth of the link and the spare bandwidth, that is, bandwidth currently available for new circuits. Thus, available bandwidth equals total bandwidth minus the bandwidth used up by existing circuits.

In order to clearly illustrate the present invention, the following capacity planning related network operations and concepts will first be described. These capacity planning related network operations and concepts are:

1. Provisioning a new (service) circuit;
2. Path generation;
3. Restoration of failed circuits;
4. Re-grooming of misrouted circuits;
5. Lead time for provisioning new capacity;
6. Minimum capacity augment size;
7. Capacity Planning Period.

Provisioning a New (Service) Circuit: A new circuit order between a pair of switches is provisioned as follows:

1. One of the switches is selected as the source of this circuit and the other as the destination.
2. The source switch calculates a path (also called a route) for the circuit using information collected by the Routing protocol. The information typically includes network topology, available network resources, etc. The path must have sufficient network resources to meet the quality of service requirements (bandwidth, delay, etc.) of the circuit.

The source switch then sets up the circuit using the signaling protocol. A setup message is sent out along the selected path of the circuit. Each switch in the path checks to see if the requested resources are available and then allocates the resources to the circuit. If all switches are able to allocate the resources then the setup succeeds or it fails otherwise. An unsuccessful setup attempt may result in a crankback to the source that then tries to set the circuit up on a different path. The new path must also have sufficient resources to meet the needs of the circuit.

Path Generation: Typically, paths are generated using variants of Dijkstra's shortest path algorithm. The weight of a path is the sum of the weight of the links in the path. Dijkstra's algorithm seeks to find the path with the minimum weight. Often the weights assigned to links are proportional to the cost of a unit of bandwidth on the links. If this is the case, then the Dijkstra algorithm results in the minimum cost path. It is possible that there are several paths with identical weights.

Restoration of Failed Circuits: Whenever there is a failure, such as a fiber cut or switch failure, a number of circuits may be impacted. The switches adjacent to the failure first detect the failure condition, identify the circuits affected by it, and then initiate control messages releasing these circuits. The release messages travel back to the source and the destination of the circuit, releasing all resources held by the circuit along the way. The source switch then needs to determine a new path and try to establish the failed circuit on this new path. This is called restoring the circuit. The new path must have sufficient resources to meet the needs of the circuit. It must also avoid the failed part of the network. Information about the failed part is disseminated by the Routing protocol but there may be a short delay in getting this information. The release (crankback) message may also contain information regarding where the circuit (setup) failed. Generally, the procedure used to restore the circuit is identical to the method used to provision it in the first place. Often, there are some variations. Some switches pre-calculate a restoration path for each circuit. This path is attempted first whenever the circuit fails. If the setup attempt on this pre-calculated path fails, then the Dijkstra algorithm is run to obtain a new path.

Unsuccessful restoration attempts also result in crankbacks, and it is not unlikely that a circuit may crankback multiple times before it finally restores. Each crankback increases the amount of time the service associated with the circuit suffers an outage and it is desirable that the number of crankbacks be minimized. The failed circuits all compete for the same available network resources during restoration. It is quite likely that there are insufficient network resources to restore all failed circuits. In this case, some of the circuits will not restore and remain in the failed state.

Re-grooming of Misrouted Circuits: Often as these networks grow and more nodes and links are added, new shorter (better) paths may be created and there may be many circuits that are no longer on their shortest path. The activity of moving a circuit from its current path to a shorter path is called re-grooming and involves disconnecting the circuit on its current path (called break), releasing network resources held by the circuit, and establishing it on the new path (called make). The order in which these two activities are done can vary. The method is typically break-before-make and there is a small period of time during which the circuit is not operational. This is referred to as a circuit hit and may involve informing the customer of the circuit hit and obtaining a release before it can be done.

There can be categories of circuits on which the customers are not willing to let their circuits to be re-groomed even if better paths exist in the network. A circuit on a shorter path uses fewer network resources and leads to better utilization of the network.

Lead Time for Provisioning New Capacity: As the network grows and more circuits are provisioned, network resources such as ports on switches and available bandwidth on links start to get exhausted and need to be replenished. The process of ordering and adding new ports and links involves many activities and takes a fair amount of time. This is known as the lead-time to order new capacity. The longer the lead-time the earlier new capacity has to be ordered before its exhaust date.

The exhaust date itself is difficult to calculate and involves forecasting the usage into the future. As lead-time is typically in weeks and months, it is a challenging problem when to order new capacity. If it is ordered too far in advance of the (estimated) exhaust date then the network carries excess capacity and there is a cost associated with the excess. On the other hand, if it is ordered to close to the exhaust date, there is a danger of running out of capacity. In this case, new circuits may not be provisioned on their shortest route if any part of the shortest path has insufficient capacity. Circuits provisioned on a longer path have to be re-groomed to the shorter path at some later date incurring both cost and a service interruption. A circuit that cannot be re-groomed and is on a longer path than is necessary results in wasted network capacity for the life of the circuit. Sometimes, the capacity shortfall is so severe that no paths may exist to provision a new circuit. There is a potential for loss of revenue associated with the lack of capacity.

Minimum Capacity Augment Size: Often, capacity is added in units larger than one. For example, the minimum capacity that could be added may be an OC-48 wavelength. In addition, the process of provisioning the new wavelength involves (relatively expensive) site visits by installers and it may pay to put in two or more wavelengths at a time to save on provisioning costs. A steadily evolving network would then fall into a pattern where a link is augmented at a certain almost regular interval. The interval could be different for different links. For example, one network link may be augmented, on average, every 4 months while another network link is augmented, on average, every 6 months. In reality, the network does not grow at a steady constant rate. The capacity planning process has to predict when the spare capacity will expire and try to get new capacity in before that happens.

Capacity Planning Period: Capacity is typically planned periodically over time. For example, it could be performed once per month. This duration is referred to as the planning period. If the capacity planning process leaves very little spare capacity (by not proposing capacity augments in certain places), then the same process will, in all likelihood, propose augments in these very same places in the next planning period to be able to accommodate the new circuits in that planning period. By not proposing the augments in the first planning period, it did not avoid the cost of the augments but really delayed it by one (or more) planning periods.

To better understand the present invention, a description of the components of such communication networks is provided below. FIG. 1 shows an exemplary communication network 100 of the present invention. The communication network 100 comprises a plurality of switches (SW) 101-106 and links 111-117. A plurality of circuits 121-122 can be deployed via the communication network 100.

In traditional capacity planning methods, given:

A communications network 100;

A set of existing circuits along with their routes, e.g., 121;

A set of new circuits to be carried, e.g., 122;

the goal is to find the new network that is the old network plus a set of link augments such that all new circuits can be routed and the cost of the augments is minimized.

Once a route is selected for each new circuit, it is simple to calculate how many link augments are needed to carry the circuits and to cost out the augments. This calculation adds up the bandwidths of all circuits routed on a particular link and subtracts the existing bandwidth to obtain the additional link capacity required. This additional capacity is rounded up to the nearest multiple of the link size to determine the number of link augments. Existing methods typically generate a set of prospective routes for each new circuit and then do an optimization over the route space to determine the network with the minimum cost of augments.

TABLE 1

Cost of link augments and variables used

| Link | Current capacity | Spare slots | Cost of OC-48 link augment | # of augments |
|---|---|---|---|---|
| 111 | $V_{111} = 1$ | 24 | $c_{111} = 1000$ | $X_{111}$ |
| 112 | $V_{112} = 1$ | 12 | $c_{112} = 500$ | $X_{112}$ |
| 113 | $V_{113} = 1$ | 4 | $c_{113} = 700$ | $X_{113}$ |
| 114 | $V_{114} = 2$ | 15 | $c_{114} = 900$ | $X_{114}$ |
| 115 | $V_{115} = 2$ | 16 | $c_{115} = 450$ | $X_{115}$ |
| 116 | $V_{116} = 1$ | 12 | $c_{116} = 1350$ | $X_{116}$ |
| 117 | $V_{117} = 1$ | 0 | $c_{117} = 550$ | $X_{117}$ |

Table 1: Cost of Link Augments and Variables Used

This type of optimization can be formulated as an Integer Programming problem with integer variables $v_j$ and $x_j$ denoting the current capacity and augments needed on link j, as shown in Table 1. Both of these variables are in units of the size of links, which for the purposes of this example is assumed to be OC-48. In reality, the unit size of a link can be a variety of bandwidth, such as OC-48, OC-192, or any amount of bandwidth appropriate to the applications or problems being addressed. Table 1 also shows the amount of spare capacity on each link (in units of STS-1 slots), and the cost of each link. An OC-48 link has a capacity of 48 STS-1 slots. The variable $c_j$ is used to denote the cost of link j. The objective function of the Integer Program is to minimize the sum of the augments times their costs. This takes the form:

$$\Sigma c_j x_j = 1000 * x_{111} + 500 * x_{112} + 700 * x_{113} + 900 * x_{114} + 450 * x_{115} + 1350 * x_{116} + 550 * x_{117}$$

Additional variables are used to select one route for each new circuit from its set of prospective routes. Table 2 illustrates this by showing one existing circuit 121 between switches 101 and 103, and a new circuit 122 between switches 105 and 103. In reality, there may be a plurality of such circuits. There is only one route listed for the existing circuit 121 and it is the actual route it takes in the network. This route consists of the links 115, 116 and 117. There may be several routes listed for new circuits. Three are listed for circuit 122 in Table 2. Known methods in the art are used to generate multiple routes between the same set of end points. Typically, the administrative weight of the link is used to generate the routes and the shortest route is the route with the least cumulative weight. Here, for simplicity, it is assumed that the administrative weights are proportional to the cost of link augments.

TABLE 2

Circuits and Routes

| Circuit | Type | Size | End points | Route 1 | Route 2 | Route 3 |
|---|---|---|---|---|---|---|
| 121 | existing | STS-3 | 101, 103 | 115, 116, 117 | | |
| 122 | new | STS-12 | 105, 103 | 116, 115, 111, 112 | 116, 115, 113, 114 | 117 |

Table 2: Circuits and Routes

The weight of route 1 consisting of links 116, 115, 111, and 112, is 3300. Similarly, the weight of route 2 is 3400 and the weight of route 3 is 550. Here, route 3 is clearly the shortest route.

The integer programming formulation has more integer variables indicating if the circuit is routed on a prospective route. The constraints of the problem assure that the existing capacity and the new augments provided sufficient capacity to carry all circuits routed on each link, based on the routes chosen for the circuits. This constraint is of the form:

$x_j + v_j \geq$ the sum of the bandwidth of all circuits routed on link j

This is a simplified description of the method for illustration purposes only and there may be many additional variables needed to define the constraints of the problem.

The spare capacity is calculated by subtracting the bandwidth of all circuits routed on link j from $x_j + v_j$.

Referring to the spare capacities in Table 1, route 1 has enough spare capacity (on each link in the route) to carry the new circuit. Hence, if this route is chosen for circuit 122, then no new augments are required and the objective function cost works out to zero. Route 2 does not have sufficient capacity to carry circuit 122 as the link 113 has just 4 spare slots, where circuit 122 has a size of STS-12. If this route is chosen, then 1 unit of augment is needed on link 113 and the objective function cost works out to be 700. Route 3 also does not have sufficient capacity to carry circuit 122 as the link 117 has zero spare slots. If this route is chosen, then 1 unit of augment is needed on link 117 and the objective function cost works out to be 550. The integer programming formulation will select route 1 for circuit 121 to minimize the cost of the objective function.

The integer programming formulations have a large number of variables and a lot of dimensional complexity. A Linear Programming based simplification and/or heuristics are often used to obtain approximate solutions. There are also other formulations, such as commodity flows, to solve this type of problem.

Let us examine the state of the network left by the three route options in the previous example.

TABLE 3

Spare capacity left by route options

| | | Route 1 is chosen | | Route 2 is chosen | | Route 3 is chosen | |
|---|---|---|---|---|---|---|---|
| Link | Initial spare | Augments needed | Resulting spare slots | Augments needed | Resulting spare slots | Augments needed | Resulting spare slots |
| 111 | 24 | 0 | 12 | 0 | 24 | 0 | 24 |
| 112 | 12 | 0 | 0 | 0 | 12 | 0 | 12 |

TABLE 3-continued

Spare capacity left by route options

| Link | Initial spare | Route 1 is chosen | | Route 2 is chosen | | Route 3 is chosen | |
|---|---|---|---|---|---|---|---|
| | | Augments needed | Resulting spare slots | Augments needed | Resulting spare slots | Augments needed | Resulting spare slots |
| 113 | 4 | 0 | 4 | 1 | 40 | 0 | 4 |
| 114 | 15 | 0 | 15 | 0 | 3 | 0 | 15 |
| 115 | 16 | 0 | 4 | 0 | 4 | 0 | 16 |
| 116 | 12 | 0 | 0 | 0 | 0 | 0 | 12 |
| 117 | 0 | 0 | 0 | 0 | 0 | 1 | 36 |

Table 3: Spare Capacity Left by Route Options

Table 3 shows the spare capacity left in the network and the number of links augments needed by the three options. Route 1 requires no new augments and leaves 12 slots less capacity on links 111, 112, 115, and 116. Route 2 requires one unit of augment on link 113, which then leaves 40 slots spare on this link. The other links used in the route, 114, 115, and 116 each have 12 slots less spare capacity. Route 3 requires one unit of augment on link 117 but leaves the network with as much spare on the remaining links as before, plus 36 slots on the new augment on link 117. Route 1 would have been the choice of traditional capacity planning methods. The spare capacity left by route 1 is much smaller than that left by route 3. The resulting network is not able to accommodate any circuits on links 112, 116, and 117 without augments on these links. If any new circuits show up in the future and need to be routed on these links, then it will not be possible to provision them. As pointed out earlier, it is not possible to accurately predict future demands and so it is quite likely that such circuits may show up. Alternately, augments will be needed on these links in the very near future.

If route 1 is selected, then as soon as link 117 is augmented in the future, the circuit 122 will show up as sub-optimally routed. On route 1 it uses 12 slots on four links whereas on route 3 it uses 12 slots on just one link. Twelve slots equate to a quarter of the capacity of an OC-48 link augment. The cost of 12 slots on route 1 is 3300/4=875 while the cost of 12 slots on route 3 is 550/4=137.50.

To sum up the observations on the capacity planning method in the prior art, it tries to minimize the cost of link augments needed to carry the demand of new circuits. In this process:
1. It may route circuits on routes longer than the shortest routes. These circuits soon become candidates to be re-groomed incurring the cost and botheration of re-grooming. If a circuit is not allowed to be re-groomed, then network resources are wasted for the life of the circuit.
2. It ignores spare capacity considerations and may leave the network with little spare capacity on each link. Now, there is a potential for a loss of (future) revenue or a large impending cost of augments needed in the very near future.

To address this criticality, the present invention provides a method and apparatus for capacity planning by introducing new factors in the optimization method to properly account for the benefits of carrying the appropriate amount of capacity in the network.

Figure 2:
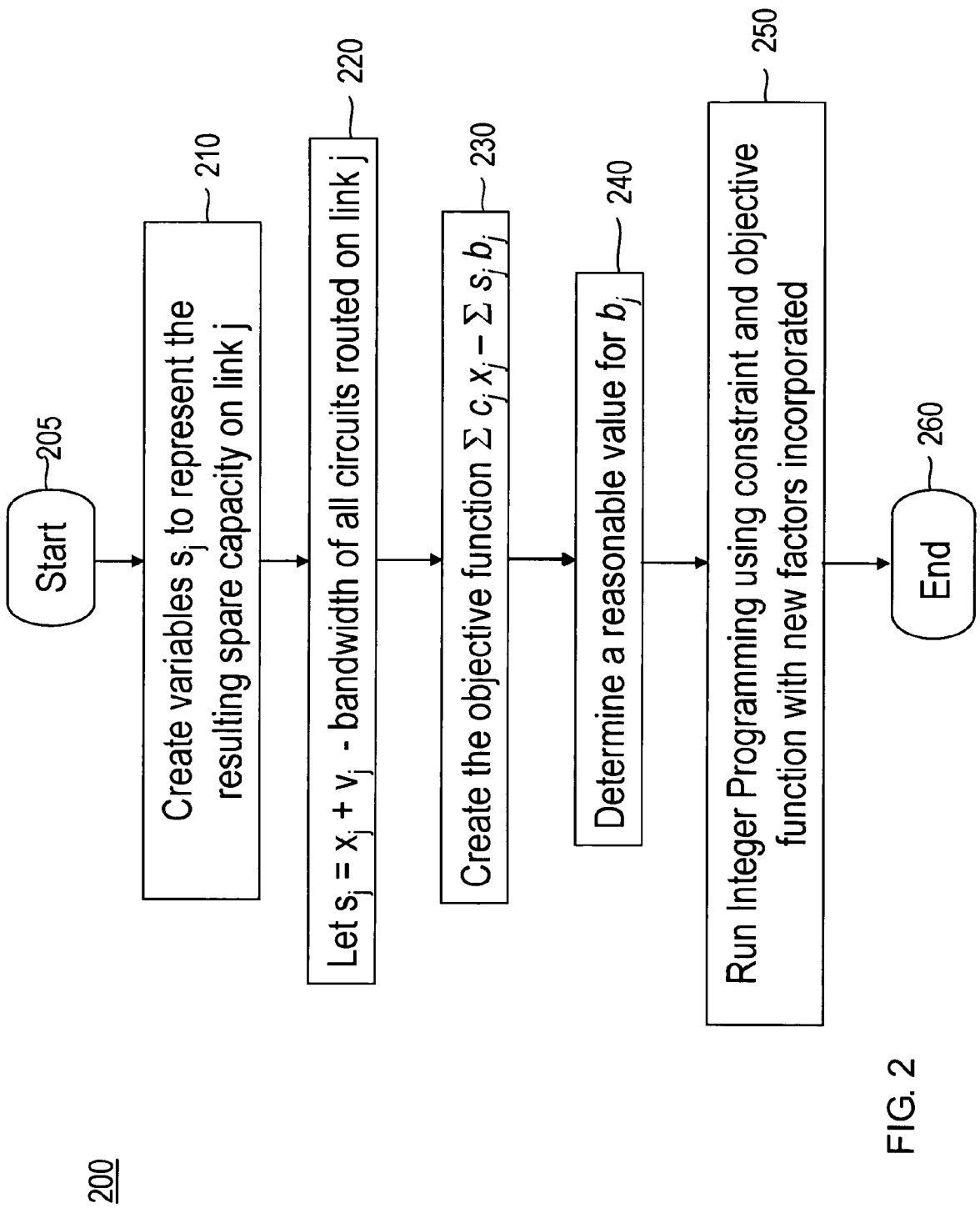
FIG. 2 illustrates a flowchart of a method for introducing new factors to properly account for the benefits of spare capacities in a network.

FIG. 2 illustrates a flowchart of a method 200 for introducing new factors in the optimization to properly account for the benefits of carrying spare capacity in a network of the present invention. Method 200 starts in step 205 and proceeds to step 210.

In step 210, the method 200 establishes new variables $s_j$ that represent the resulting spare capacity on link j.

In step 220, the method 200 creates constraints for the optimization by assigning proper values to variables used. For each link j:

$s_j = x_j + v_j$—the bandwidth of all circuits routed on link j $s_j$ is simply the existing capacity ($v_j$) plus the augmented capacity ($x_j$) minus the capacity used by existing and new circuits routed on this link. The outcome of this step is shown in Table 3 in the previous example.

In step 230, the method 200 creates the objective function for the optimization by introducing a new term in the objective function to account for the spare capacity. The present invention defines variables, $b_j$, to represent the benefit (e.g., a benefit weight) of the spare capacity of link j. The notion of benefit is similar to the notion of a negative cost (of link augments). The objective function in our formulation takes the form:

$\Sigma c_j x_j - \Sigma s_j b_j$

Note that the objective function is no longer simply minimizing the cost of all the capacity augments and now subtract the benefit of the spare capacity left in the network as well.

Note that in the prior art, the term accounting for spare capacity in the objective function does not exist. Hence, this new objective function value is always less than that of the prior art. This objective function does not suffer from the problems outlined for the prior art. Long routes are discouraged because they lead to less spare capacity, a smaller (negative) value of the second term and, thus, higher value of the objective function. Augments do not simply appear as a (large) cost. If they leave a fair amount of spare capacity behind then the cost of the augment is appropriately reduced. This would not leave the network with a small amount of spare capacity as in the prior art.

In step 240, the method 200 determines a reasonable value of the benefit of spare capacity. Typically the benefit of carrying spare capacity will always be less than the cost of adding the spare capacity.

In one embodiment of the present invention, the method sets the benefit equal to cost of adding an augment minus the cost of financing the augment for n number of capacity planning periods. Let p denote length of the capacity planning period and $\alpha$ the interest rate for capital per unit time. Then, $b_j = c_j - \alpha p n c_j = c_j(1 - \alpha p n)$ A small value of 1 to 5 is generally used for n.

In another embodiment of the present invention, the method uses different discount periods for different links. Let $q_j$ denote the discount period for link j. Then, $b_j = c_j - \alpha q_j c_j = c_j(1 - \alpha q_j)$ The discount period can be estimated based on how frequently the link has been augmented in the past or is to be augmented based on a long term forecast. For example, if six link augments were deployed last year then the link is augmented, on average, every two months and its discount period is set to 2 months. Alternately, if next year's forecast calls for 4 augments, then the link will be augmented, on average, every three months.

In step 250, once the new factors to properly account for the benefit of carrying spare capacity in the network for the optimization has been defined and determined, then the Integer Programming problem involving these new factors can be solved by using traditional Integer Programming techniques.

The method 200 ends in step 260.

To illustrate the present method using the preferred embodiment, let n=5, p=1 month, and α=1.0% per month. Then, $b_j = c_j(1-5*0.01) = 0.95c_j$ Returning to the original example and the choice of routes 1, 2 or 3 for circuit 122. Since $s_j$ is in units of link augments (OC48s in our example), the number of spare slots=$48*s_j$. Table 4 shows the benefit of the resulting spare for the three options.

TABLE 4

Benefit of resulting spare capacity left by route options

| Link | $c_j$ | Route 1 is chosen | | | Route 2 is chosen | | | Route 3 is chosen | | |
|---|---|---|---|---|---|---|---|---|---|---|
| | | $x_j$ | $48*s_j$ | $s_jb_j$ | $x_j$ | $48*s_j$ | $s_jb_j$ | $x_j$ | $48*s_j$ | $s_jb_j$ |
| 111 | 1000 | 0 | 12 | 237.5 | 0 | 24 | 475.0 | 0 | 24 | 475.0 |
| 112 | 500 | 0 | 0 | 0 | 0 | 12 | 118.8 | 0 | 12 | 118.8 |
| 113 | 700 | 0 | 4 | 55.4 | 1 | 40 | 554.2 | 0 | 4 | 55.4 |
| 114 | 900 | 0 | 15 | 267.2 | 0 | 3 | 53.4 | 0 | 15 | 267.2 |
| 115 | 450 | 0 | 4 | 35.6 | 0 | 4 | 35.6 | 0 | 16 | 142.5 |
| 116 | 1350 | 0 | 0 | 0 | 0 | 0 | 0 | 0 | 12 | 320.6 |
| 117 | 550 | 0 | 0 | 0 | 0 | 0 | 0 | 1 | 36 | 391.9 |

Table 4: Benefit of Resulting Spare Capacity Left by Route Options

If route 1 is chosen, then $\Sigma c_j x_j - \Sigma s_j b_j = -595.7$

If route 2 is chosen, then $\Sigma c_j x_j - s_j b_j = 700 - 1237 = -537$

If route 3 is chosen, then $\Sigma c_j x_j - \Sigma s_j b_j = 550 - 1771.4 = -1221.4$ Hence, route 3 results in a lower objective function value than route 1 and is the best choice with the present new objective function. It should be noted that a lower objective function value is representative of a lower overall cost of provisioning or setting up said circuit.

In one embodiment of the present invention, the method 200 can be modified to maintain a minimum amount of spare capacity on each link. Let $d_j$ denote the desirable minimum amount of spare capacity to be maintained on link j. This can be accomplished by modifying the capacity constraints to the following form:

$x_j + v_j - d_j \geq$ the sum of the bandwidth of all circuits routed on link j The present invention can be easily extended in a straight forward manner to planning restoration capacity as well. Service capacity is the capacity needed to provision new circuits. Restoration capacity refers to the capacity needed to restore failed circuits in the event of a network failure. Once the service capacity is planned, restoration capacity is traditionally planned in the following manner:

1. Evaluate all potential failure scenarios, one by one,
2. For each failure scenario, determine the circuits that are affected by the failure,
3. For each affected circuit, determine a number of potential restoration routes,
4. Determine minimum cost links augments by optimizing over the restoration route space, just like the optimization over the service route space,
5. For each link, the restoration capacity needed is the maximum of the augments needed by the various failure scenarios.

Steps 3 and 4 are identical to the way service capacity is traditionally planned, while the circuits in step 2 are similar to a demand of new circuits.

Although the present invention is applied to the class of problems related to network capacity planning or capacity management, those skilled in the art will realize that the present invention can also be applied to the class of problems related to network design, or in general to any method that has to evaluate the cost of a network. The idea is to compute cost of a network by taking the value or benefit of the spare capacity into account. In network design class of problems, the minimum cost network (switches and links) is required for carrying a given set of circuits. There are no existing circuits as the network is new. The locations of the switches may be determined in network design in addition to determining the link sizes. The network may be sized to be able to restore circuits for given failure scenarios as well.

Another method used to design networks is called simulated annealing. Those skilled in the art will realize that the present invention can also be applied to the method of simulated annealing for designing networks. This method starts with any solution and calls it the selected design. It then modifies the design slightly based on certain criteria. If the modified design cost is lower than the selected design cost, then the modified design becomes the selected design. Otherwise, the design is modified again and the process repeated. Every now and then, the method does a big modification of the design instead of small changes. This big change may result in a deteriorated network cost and is to get out of local minima. The process is repeated until the improvements in network cost are below a prescribed threshold or a prescribed number of iterations have been done.

Figure 3:
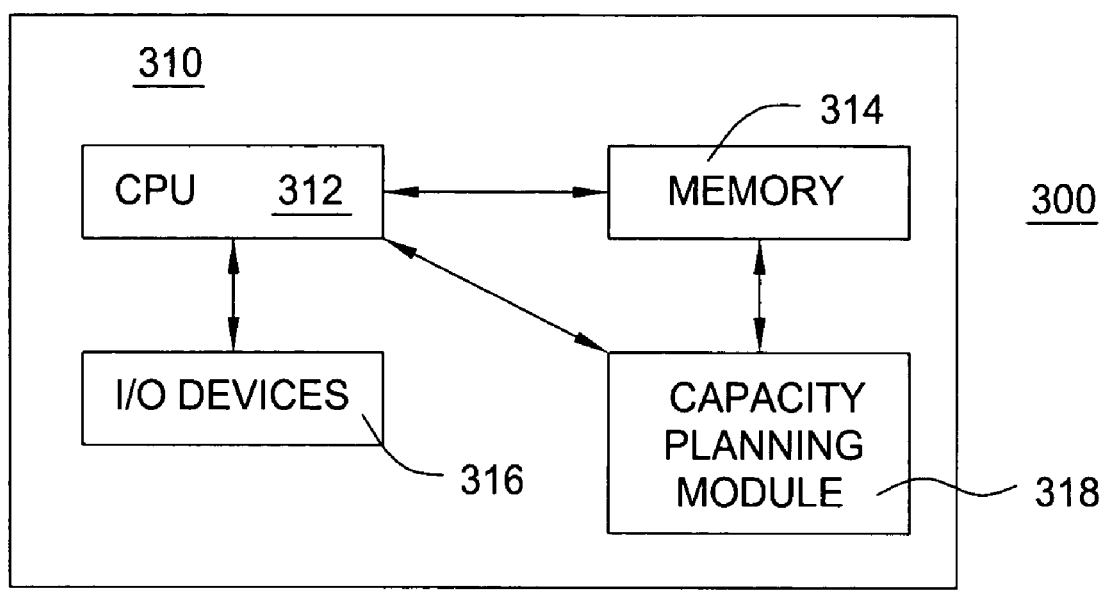
FIG. 3 illustrates a high level block diagram of a general purpose computer suitable for use in performing the functions described herein.

FIG. 3 illustrates the present capacity planning invention implemented using a general purpose computer or any other hardware equivalents. More specifically, the personal computer 310 comprises a processor (CPU) 312, a memory 314, e.g., random access memory (RAM) and/or read only memory (ROM), and a capacity planning engine, manager or application 318, and various input/output devices 316 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), a modem, at least one network interface card (NIC) or a microphone for capturing speech commands).

It should be understood that the capacity planning engine, manager or application 318 can be implemented as a physical device or subsystem that is coupled to the CPU 312 through a communication channel. Alternatively, the capacity planning engine, manager or application 318 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 314 of the computer. As such, the capacity planning engine, manager or application 318 (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for assisting capacity planning in a network having a plurality of links, said method comprising the steps of:
   determining spare capacity on at least one link of the network, where said spare capacity is representative of an existing capacity plus an augmented capacity minus a bandwidth of all circuits routed on said at least one link of the network;
   applying a benefit weight to said spare capacity;
   computing an overall cost in accordance with said spare capacity for provisioning a circuit on said at least one link of the network, wherein said computing step comprises:
      minimizing a function of $\Sigma c_j x_j - \Sigma s_j b_j$, to obtain said overall cost, where $s_j$ represents said spare capacity for a link j, where $b_j$ represents said benefit weight for said link j, where $x_j$ represents said augmented capacity for said link j, and where $c_j$ represents a cost for said link j; and
   outputting said overall cost to an output device.

2. The method of claim 1, further comprising:
   applying run integer programming to said function.

3. The method of claim 1, further comprising:
   applying simulated annealing to said function.

4. A method for assisting capacity planning in a network having a plurality of links, said method comprising the steps of:
   determining spare capacity on at least one link of the network, where said spare capacity is representative of an existing capacity plus an augmented capacity minus a bandwidth of all circuits muted on said at least one link of the network;
   applying a benefit weight to said spare capacity, wherein said benefit weight accounts for a cost for financing said augmented capacity, wherein said benefit weight, $b_j$, is expressed as:

$$b_j = c_j - \alpha p n c_j = c_j(1 - \alpha p n)$$

where $c_j$ represents a cost for a link j, where $\alpha$ represents an interest rate for capital per unit time, where n represents a number of capacity planning periods, and where p represents a length of said capacity planning period;
   computing an overall cost in accordance with said spare capacity for provisioning a circuit on said at least one link of the network; and
   outputting said overall cost to an output device.

5. A method for assisting capacity planning in a network having a plurality of links, said method comprising the steps of:
   determining spare capacity on at least one link of the network, where said spare capacity is representative of an existing capacity plus an augmented capacity minus a bandwidth of all circuits routed on said at least one link of the network;
   applying a benefit weight to said spare capacity, wherein said benefit weight accounts for a discount period, wherein said benefit weight, $b_j$, is expressed as:

$$b_j = c_j - \alpha q_j c_j = c_j(1 - \alpha q_j)$$

where $c_j$ represents a cost for a link j, where $\alpha$ represents an interest rate for capital per unit time, and where $q_j$ represents said discount period;
   computing an overall cost in accordance with said snare capacity for provisioning a circuit on said at least one link of the network; and
   outputting said overall cost to an output device.

6. An apparatus for assisting capacity planning in a network having a plurality of links, comprising:
   means for determining spare capacity on at least one link of the network, where said spare capacity is representative of an existing capacity plus an augmented capacity minus a bandwidth of all circuits routed on said at least one link of the network;
   means for applying a benefit weight to said snare capacity; and
   means for computing an overall cost in accordance with said spare capacity for provisioning a circuit on said at least one link of the network, wherein said computing means minimizes a function of $\Sigma c_j x_j - \Sigma s_j b_j$, to obtain said overall cost, where $s_j$ represents said spare capacity for a link j, where $b_j$ represents said benefit weight for said link j, where $x_j$ represents said augmented capacity for said link j, and where $c_j$ represents a cost for said link j.

7. A computer-readable medium having stored thereon a plurality of instructions, the plurality of instructions including instructions which, when executed by a processor, cause the processor to perform the steps comprising:
   determining spare capacity on at least one link of the network, where said spare capacity is representative of an existing capacity plus an augmented capacity minus a bandwidth of all circuits routed on said at least one link of the network;
   applying a benefit weight to said snare capacity; and
   computing an overall cost in accordance with said spare capacity for provisioning a circuit on said at least one link of the network, wherein said computing step comprises:
      minimizing a function of $\Sigma c_j x_j - \Sigma s_j b_j$, to obtain said overall cost, where $s_j$ represents said spare capacity for a link j, where $b_j$ represents said benefit weight for said link j, where $x_j$ represents said augmented capacity for said link j, and
   where $c_j$ represents a cost for said link j.

* * * * *